United States Patent [19]

Lim

[11] Patent Number: 5,390,026
[45] Date of Patent: Feb. 14, 1995

[54] CHARACTER EDITING CIRCUIT OF CAMCORDER

[75] Inventor: Han-Jun Lim, Seoul, Rep. of Korea

[73] Assignee: Samsung Electronics Co., Ltd., Kyungki-do, Rep. of Korea

[21] Appl. No.: 82,854

[22] Filed: Jun. 28, 1993

[30] Foreign Application Priority Data

Jun. 26, 1992 [KR] Rep. of Korea ............ 92-11403

[51] Int. Cl.6 .................................................. H04N 5/76
[52] U.S. Cl. ..................... 358/335; 358/906; 348/578; 360/14.2; 360/27
[58] Field of Search .............. 358/335, 906, 909, 310, 358/311, 319, 21 R, 22, 183; H04N 5/76, 5/225, 9/79; 360/33.1, 37.1, 27, 13, 14.1, 14.2, 14.3; 348/571, 578

[56] References Cited

U.S. PATENT DOCUMENTS

| | | | |
|---|---|---|---|
| 4,549,231 | 10/1985 | Namiki | 360/14.2 |
| 5,097,348 | 3/1992 | Suetaka | 358/335 |
| 5,124,814 | 6/1992 | Takahashi et al. | 358/906 |
| 5,175,629 | 12/1992 | Lee et al. | 358/335 |

Primary Examiner—Tommy P. Chin
Assistant Examiner—Khoi Truong
Attorney, Agent, or Firm—Sughrue, Mion, Zinn, Macpeak & Seas

[57] ABSTRACT

A camcorder which can record and reproduce an image signal, and more particularly relating to a camcorder character editing circuit which can change control pulses recorded on a control track of a tape, thereby recording character information, so that the control pulses can be read out during the reproducing process to thereafter display the character information on an existing image signal. A control circuit outputs character information data and a predetermined control signal to a control head, to thereby be recorded on a control track, and during a reproduction process, outputs character information, detected by a data detecting circuit, to an on-screen-display integrated circuit to thereby display the character on a screen and to thereafter obtain a control signal from the control signal data.

7 Claims, 4 Drawing Sheets

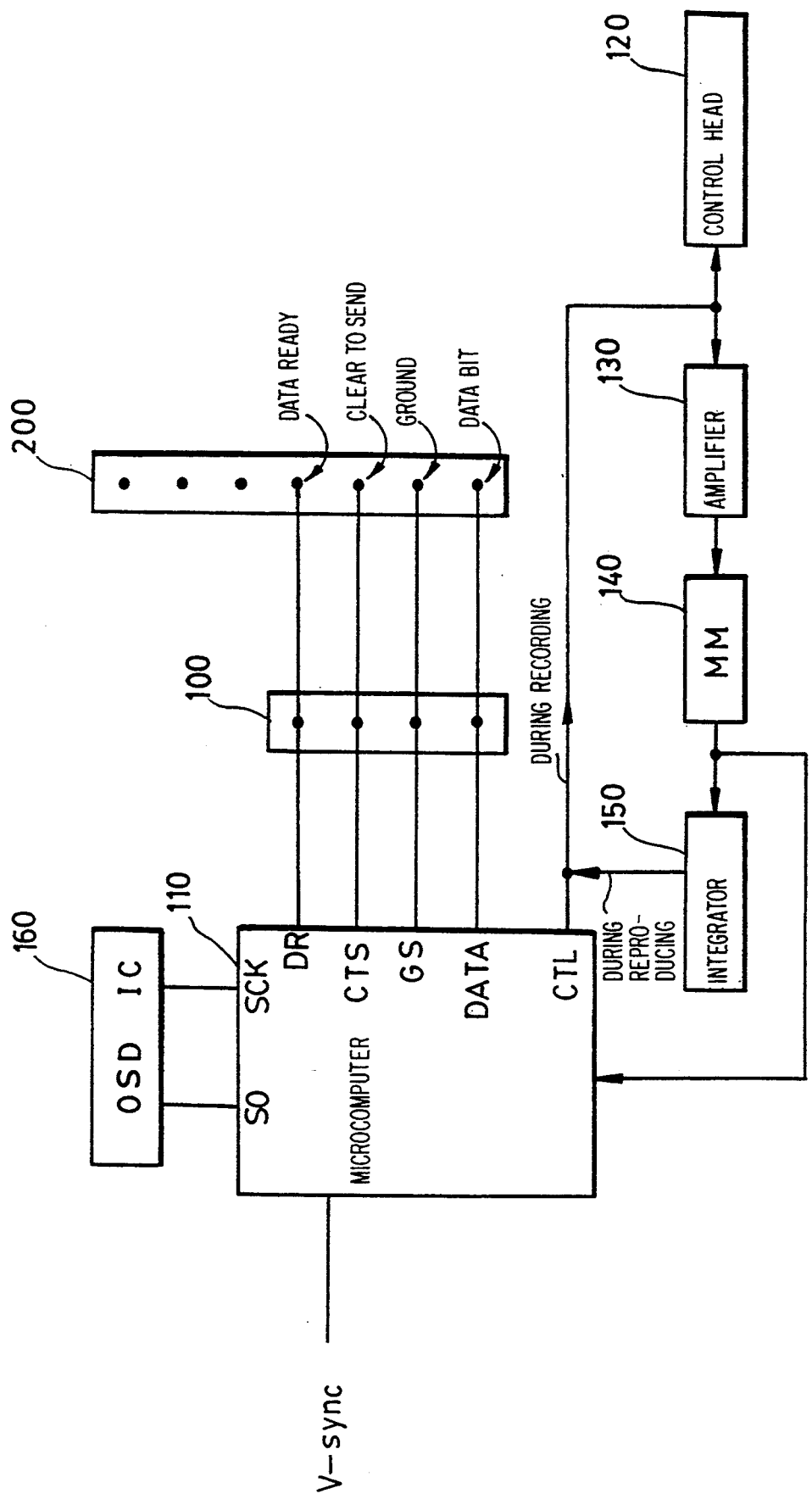

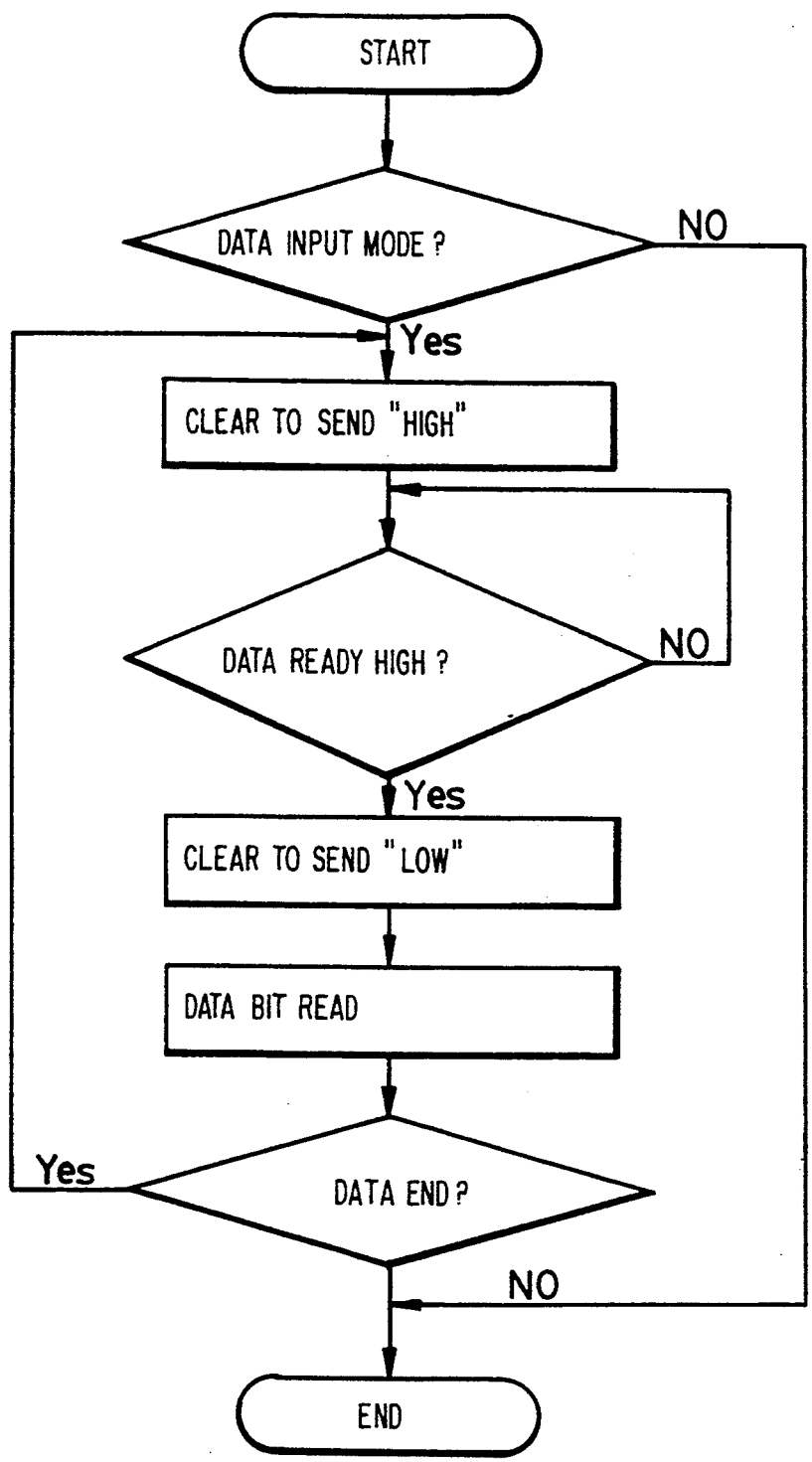

FIG. 3A
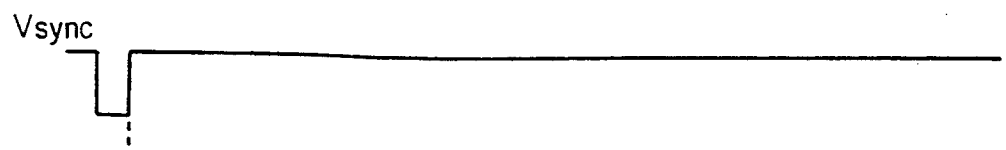
FIG. 3B
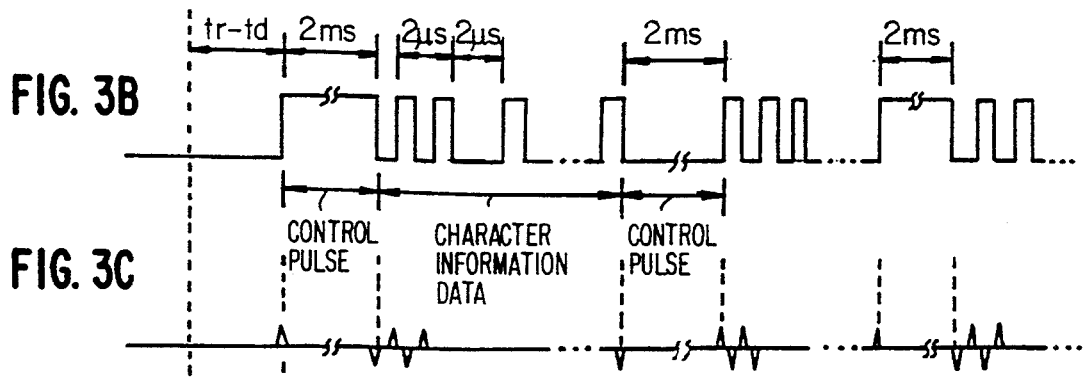
FIG. 3C
FIG. 3D
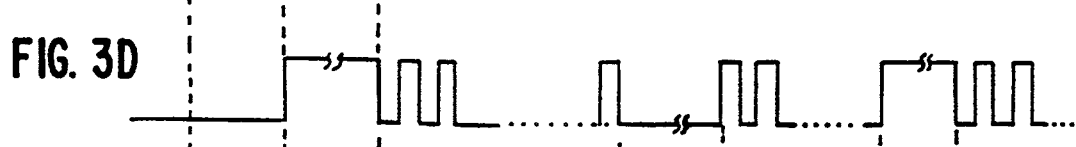
FIG. 3E
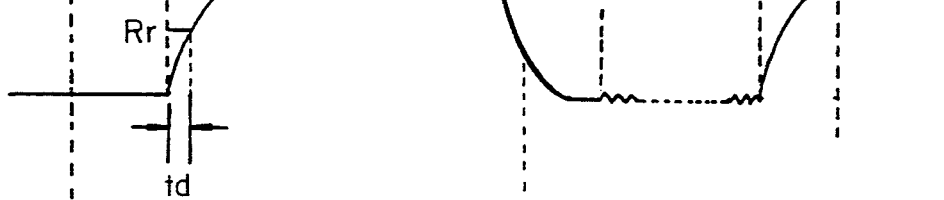
FIG. 3F
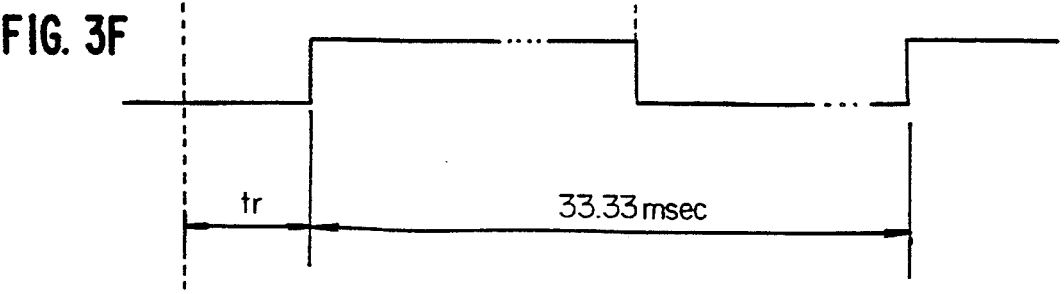

| CHARACTER | DATA CODE (HEXA-DECIMAL) |
|---|---|
| A | 88H |
| B | 89H |
| C | 90H |
| ⋮ | ⋮ |
| ? | FEH |
| . | FFH |

CHARACTER EDITING CIRCUIT OF CAMCORDER

BACKGROUND OF THE INVENTION

1. Field of the Invention

The present invention relates to a camcorder which can perform the recording and reproducing of an image signal, and more particularly relates to a character editing circuit of a camcorder which can change control pulses recorded on a control track of a tape to thereby record character information, so that the control pulses can be read out during the reproducing to thereafter display the character information on an existing image signal.

2. Description of the Prior Art

A camcorder is an apparatus for recording an image and an audio signal on a small video tape to thereafter reproduce the same.

Recently, a method has been proposed for recording character information in addition to the image and audio signal.

Specifically, for example, in Japanese laid open patent application No. Hei 3(1991)-153179 entitled, "Title Recording Method" a method has been proposed for memorizing title image information in an image memory to thereby record the title image information in a title recording domain of the video tape at a predetermined time during the recording.

However, the Japanese patent application No. Hei 3-153179 not only needs to store image information in an image memory but also needs to store the title information in the image memory. Thus, a problem arises in that a large amount of characters, such as with an infant diary can not be recorded.

Meanwhile, caption processing has been utilized in the prior art in order to record a large amount of characters, as in an infant diary.

However, in order to perform the caption processing, the infant diary corresponding to the caption has to be filmed in adance to thereby record the infant diary along with the previously filmed image signal on the video track of the tape by way of an expensive broadcasting editing apparatus, which is practically impossible for use by the general public.

Furthermore, if the infant diary is filmed to thereby be edited without using the expensive broadcasting editing apparatus, there arises a further problem in that the existing image signal can be erased.

SUMMARY OF THE INVENTION

Accordingly, it is an object of the present invention to provide a character editing circuit of a camcorder for easily editing a character information without causing any damage to the existing image signal.

To attain the above described object, a character editing circuit of a camcorder comprises a control means for changing control pulses to data, indicative of inputted character information, to thereby be outputted when the character information is inputted during a recording process, and for outputting a signal indicative of the character information to an on-screen-display integrated circuit when the data is inputted during a reproducing process; a control head for recording and reproducing the data indicative of the character information outputted from the control means on a control track; and data detecting means for applying to the control means the control pulses in which the character information data reproduced from the control means is waveform-shaped and integrated, wherein the control means outputs the character information data and a predetermined control signal data to a control head to thereby be recorded on a control track, and during a reproducing process, outputs character information detected by the data detecting means to an on-screen-display integrated circuit to thereby make the character displayed on a screen and to thereafter obtain a control signal from the control signal data.

BRIEF DESCRIPTION OF THE DRAWINGS

For a fuller understanding of the nature and objects of the invention, reference should be made to the following detailed description taken in conjunction with the accompanying drawings in which:

FIG. 1 is a block diagram of a character editing circuit of a camcorder in accordance with the present invention;

FIG. 2 is a flow chart for explaining an operational sequence wherein a microcomputer receives data from a computer, as illustrated in FIG. 1;

FIGS. 3A to 3F are waveform drawings of FIG. 1.

DETAILED DESCRIPTION OF THE INVENTION

Figures 4, 5:
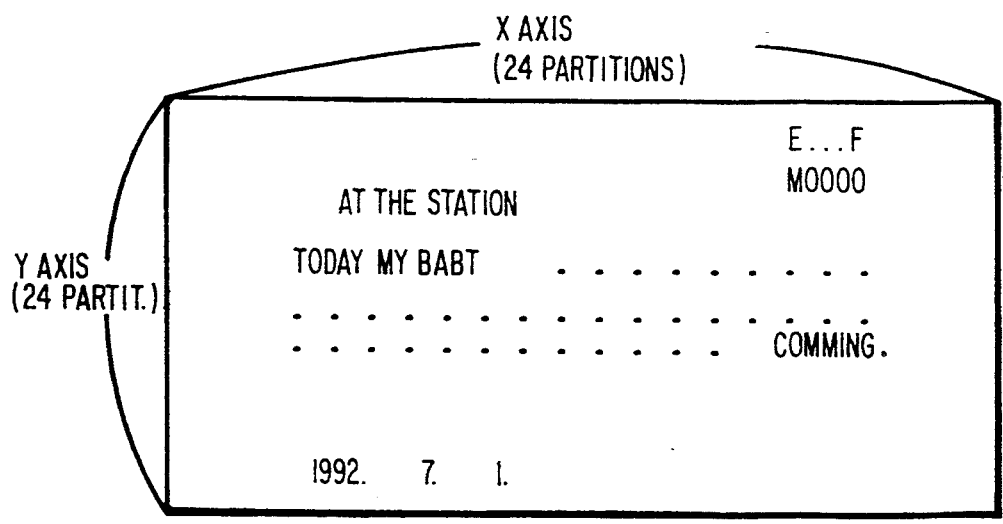
FIG. 4 is an embodiment of a data code in accordance with the present invention.
FIG. 5 is an On-Screen-Display (OSD) embodiment in accordance with the present invention.

FIG. 1 is a block diagram of a character editing circuit of a camcorder in accordance with the present invention wherein a control means outputs character information data and a predetermined control signal data to a control head to thereby record the same on a control track, and during a reproducing process, outputs the character information detected by a data detecting means to an OSD Integrated Circuit IC, so that the character can be displayed on a screen and a control signal can be obtained from the control signal data.

A camcorder port 100 receives the character information data through a serial port 200 of a computer to thereby output the same to a microcomputer 110 which acts as is a control means.

The microcomputer 110, during a recording process, outputs the character information data and the predetermined control signal data input from the port 100.

A control head 120 records the character information data output from the microcomputer 110 and records the predetermined control signal data on the control track of a recording medium to thereafter reproduce the same.

A data detecting means generates character information data in accordance with a signal reproduced by the control head 120 and a control signal to thereafter output the same to the microcomputer 110.

At this point, the data detecting means comprises: an amplifier 130 for amplifying a signal reproduced by the control head 300; a mono-multivibrator (MM) 140 for generating rectangular waves in accordance with the signal amplified by the amplifier 130; and an integrator 150 for generating a control signal by integrating the rectangular waves output from the mono-multivibrator 140.

Meanwhile, the microcomputer 110 outputs character information data detected from the data detecting means to an OSD IC 160.

The OSD IC 160 receives character information data input from the microcomputer 110 to thereby generate a character, so that the same can be displayed on a screen.

Hereinafter, an operational sequence of the character editing circuit of a camcoder thus constructed in accordance with the present invention is described in detail with reference to the accompanying drawings.

The microcomputer 110 receives character information from the computer.

FIG. 2 is a flow chart for explaining an operational sequence wherein a microcomputer receives data from the computer (not shown), as illustrated in FIG. 1.

When in data input mode, the microcomputer 110 outputs a "Clear to Send" signal in a high level to an output terminal CTS as an indication that the microcomputer 110 is ready to receive a data.

The "Clear to Send" signal is input to a port of the computer through the port 100 of the camcorder.

The microcomputer 110 outputs the "Clear to Send" signal in the high level to thereafter discriminate whether or not a Data Ready DR port is in a high level.

At this moment, as an indication that the computer is ready to to send the character information data through a port 200, the computer outputs "high" a Data Ready signal, and the microcomputer 110 sets the "Clear to Send" CTS port in "low" if the Data Ready signal is "high".

Thereinafter, the microcomputer 110 reads through a data port DATA the character information data input through the port 100.

The microcomputer 110 then reads the data to thereafter discriminate whether the data is the last data.

If the data is the last data, the microcomputer 110 terminates the data reading and if the data is not the last data, the microcomputer 110 outputs a "high" "Clear to Send" signal to the output terminal CTS.

As seen from the foregoing, the microcomputer 110 receives the character information data from the computer.

The microcomputer 110, when the character information data is input from the computer, outputs a control pulse having a predetermined width (approximately 2 ms) along with the character information data to a control port CTL as shown in FIG. 3B.

The character information data output to the control port CTL, is recorded on the control track of a tape by a control head 120, along with the control pulse.

Here, when a vertical synchronous signal Vsync as illustrated in FIG. 3A is input, the microcomputer 110 outputs control pulses having a predetermined width (approximately 2 ms) after a predetermined delay time (tr-td) as shown in FIG. 3B and character information data having a width of 2 µs per bit.

In other words, a high interval control pulse, having a predetermined width (2 ms), is established at a rising edge of conventional pulses and a low interval control pulse is established having a predetermined width (2 ms) at a trailing edge.

A remaining interval is established to record a character information data having width of 2 µs per bit.

At this moment, a character data "1" is represented by a low interval of 1µs and a high interval of 1 µs and a character data "0" is expressed in a low interval of 2 µs.

When the control pulses as illustrated in FIG. 3B are recorded on the control track of the tape and the character information data are reproduced by the control head 120, the amplifier 130 of the data detecting means amplifies the same to thereafter output the same signal as illustrated in FIG. 3C.

The mono-multivibrator 140 receives a signal amplified from the amplifier 130 to thereafter output the same in a rectangular wave as illustrated in FIG. 3D.

The waveform as illustrated in FIG. 3D and output from the mono-multivibrator 140 is input into the integrator 150 and simultaneously into the microcomputer 110.

The microcomputer 110, when a waveform as illustrated in FIG. 3D is input, extracts only the character information data to thereby output the same to the OSD IC 160.

The OSD IC 160 generates character information by way of an input character information data to display the same, thereafter on the screen.

Meanwhile, the integrator 150 of the data detecting means integrates a signal as illustrated in FIG. 3D and output from the mono-multivibrator 140 to thereafter output the same signal as illustrated in FIG. 3E.

In other words, when control pulses high-level having a width of 2 ms are input, the integrator 150 outputs an increasing signal during a constant predetermined time period($\tau$), and when low level control pulses having a width of 2 ms are inputted, the integrator 150 output a decreasing signal during a constant predetermined time period($\tau$).

At this moment, if data encoded as 00H(hereinafter H represents a hexadecimal digit) exists continuously in a high interval of control pulses, which can be misinterpreted as a low interval of control pulses, a data system is so changed that a probability of "0" continously coming out should be reduced to the maximum to thereby be recorded.

In other words, in recording a character information, because it is enough to have a total of 62 characters by adding capital letters (26 letters) and small letters (26 letters) of the English language and special characters (10 characters), there is a reduced probability of "0" coming out continuously if a 16-bit data from 88H to FFH is used for the data system as illustrated in FIG. 4.

In other words, if the 16-bit data ranging from 88H to FFH is used, a data which has the largest probability of generating "0" continously is "COH", which is "1100 0000", so that a maximum of 6 bits can become "0" continuously.

Therefore, even though the "COH" data becomes low for 12 µs (2 µs×6), the microcomputer 110 should not recognize the data as the 2 ms control pulses.

Accordingly, the integrator 150 should establish a time constant in order not to be recognized as low by the microcomputer 110, even though a signal inputted from the mono-multivibrator 140 is input as low for up to 12 µs during an interval when the control pulses should be high.

In other words, the integrator 150 should maintain an output above a predetermined level Rr as illustrated in FIG. 3E to thereby be recognized as high by the microcomputer 110, even though a low interval of up to 12 µs is continuously input during an interval when the control pulses are high as illustrated in FIG. 3F.

At this moment, the interval which should not be recognized as low by the integrator 150 has been designated as 12 µs however this is just an embodiment and can be changed along with the data system.

Furthermore, a data for showing a position on a screen is displayed as a 16-bit data, an 8-bit each for X.Y coordinate in the ordinary OSD IC 160, which can be converted to a data such as OOh, so that FFH data can be used at E1H to thereby display X.Y coordinate as 24×12 as illustrated in FIG. 5 because a misinterpretation of the control pulses can be generated if the low interval is long.

When the control pulses are recorded during the recording process in the manner thus described, a 32-bit valve is needed comprising 16-bit X.Y screen coordinate valve and a 16-bit character data valve, in order to display one character.

In the meantime, because 60 2 ms-control-pulse-intervals exist in one-second period (because recording occurs at 30 Hz, and each cycle includes a high and a low control pulse, each 2 ms long, thus, 2 2 ms control-pulse periods occur per 33.33 ms), a character data can be recorded during 1000 ms−120 ms=980 ms where 120 ms 120 ms corresponds to 60×2 ms).

At this point, because one bit is represented by 2 $\mu$s 490000 bits (=980 ms/2 $\mu$s) can be recorded.

Therefore, 1500 characters(=490000 bits/32 bits per character) can be recorded in one second.

Furthermore, the maximum of 256 characters are displayable via the OSD on the on a screen, among which, as illustrated in FIG. 5, 200 characters can be displayed excluding E . . . F a previously-used portion such as M oooo and peripheral 50 character information thereof, so that a display can be possible with 1500 characters recordable during one second, and without any blinking of the characters.

Accordingly, when such a signal as outputted from the mono-multivibrator 140 and as illustrated in FIG. 3D is integrated, the level integrated by the integrator 150 becomes above a predetermined level Rr or below the predetermined level only by way of a signal having a predetermined pulse width (2 ms) as illustrated in FIG. 3E.

When such a signal as outputted from the interator 150 and as illustrated in FIG. 3E is inputted, the microcomputer 110 comes to recognize a signal having a level above the predetermined level Rr as "high" and a signal having a level below the predetermined level Rr as "low".

As described in the aforesaid, when the signal is recoginzed as "high" and "low", a delay time td is generated.

In other words, after a vertical synchronous signal Vsync of FIG. 3A is inputted as illustrated in FIG. 3F, the microcomputer 110 recognizes a signal generated with a time delay tr as a general control signal.

The microcomputer 110 recognizes the control signal, as illustrated in FIG. 3F, to thereafter perform a capstan phase control.

As seen from the foregoing, the character editing circuit of a camcorder in accordance with the present invention can easily achieve an effect of editing a large amount of character information without causing damages to an existing image signal by way of recording a character information data on a control track and varying control pulses.

The foregoing description and drawings are illustrative and are not to be taken as limiting. In practice, many variations are possible to those skilled in the art without departing from the scope of the invention.

Specifically, in the above description, an integrator has been used when a control signal is generated from the signal outputted from a mono-multivibrator however, it should be also apparent that the control pulses can be generated when a time a signal input of high level or low level is directly inputted beyond a predetermined period of time is discriminated as high or low.

Furthermore, the character editing circuit of a camcorder in accordance with the present invention can adjust a data for illustrating an X.Y coordinate to thereby move a character up/down and left/right slowly so that the character information can be displayed.

What is claimed is:

1. A character editing circuit of a camcorder comprising:

control means for changing control pulses to data indicative of input character information to thereby be output to a control track of a recording medium when the character information is input during a recording process, and for outputting a signal indicative of the character information to an on-screen-display integrated circuit when the data indicative of the character information is input from the control track of the recording medium during a reproducing process;

control head for recording and reproducing the data indicative of the character information output from the control means to the control track; and data detecting means for applying to the control means the control pulses in which character information data reproduced from the control track is waveform-shaped and integrated, wherein the control means outputs the character information data and a predetermined control signal data to a control head to thereby be recorded on the control track, and during a reproducing process, outputs character information detected by the data detecting means to an on-screen-display integrated circuit to thereby display the character, represented by the character information on a screen and to thereafter obtain a control signal from the control signal data.

2. A character editing circuit of a camcorder as defined in claim 1, wherein the control means is characterized to receive the character information from a computer through a port.

3. A character editing circuit of a camcorder as defined in claim 1, wherein a predetermined control signal data recorded on the control track has a different pulse width in order to distinguish from the character information data.

4. A character editing circuit of a camcorder as defined in claim 1, wherein the data detecting means comprises:

an amplifier for amplifying a signal reproduced by the control head;

a mono-multivibrator for generating rectangular waves in accordance with the signal amplified from the amplifer; and an integrator for generating a control signal by integrating the rectangular waves output from the mono-multivibrator.

5. A character editing circuit of a camcorder as defined in claim 4, wherein the rectangular waves generated from the mono-multivibrator include the character information data and control signal data.

6. A character editing circuit of a camcorder as defined in claim 1, wherein the control head records the character information data output from the control means and the predetermined control signal data on the control track of a recording medium to thereby reproduce the character information data and the control signal data.

7. A character editing circuit of a camcorder as defined in claim 1, wherein the on-screen-display integrated circuit receives the character information data from a microcomputer to thereby generate the character represented by the character information data, so that the character can be displayed on the screen.

* * * * *